(No Model.)

W. A. SHULER.
VEHICLE TIRE.

No. 602,038. Patented Apr. 5, 1898.

WITNESSES:
L. L. Allen
A. J. Dionisio

INVENTOR:
W. A. Shuler
By R. J. McCarty
his ATTORNEY.

UNITED STATES PATENT OFFICE.

WILLIAM A. SHULER, OF ARCANUM, OHIO.

VEHICLE-TIRE.

SPECIFICATION forming part of Letters Patent No. 602,038, dated April 5, 1898.

Application filed October 9, 1896. Serial No. 608,347. (No model.)

*To all whom it may concern:*

Be it known that I, WILLIAM A. SHULER, a citizen of the United States, residing at Arcanum, in the county of Darke and State of Ohio, have invented certain new and useful Improvements in Vehicle-Wheel Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to new and useful improvements in vehicle-wheels; and it consists of means for securing the tire, which may be either a solid-rubber or a cushion or inflatable tire.

The object of the invention is to provide such means whereby the ordinary wooden wheel may be fitted with tires of the above description without remodeling the wheel or changing it in any manner, not even removing the usual iron tire therefrom.

The main object of the invention is to provide a tire of this character that can be placed upon wheels that are already in use by an ordinary mechanic, thus avoiding the trouble and expense of sending the wheels to a factory to be fitted with tires.

To these ends the improvements have reference to a construction hereinafter described in connection with the accompanying drawings, of which—

Figure 1:
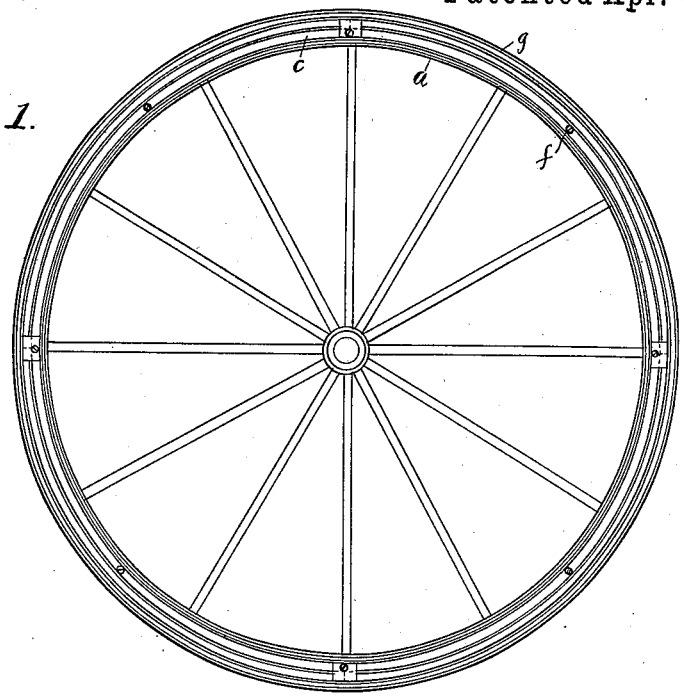
Figure 2:
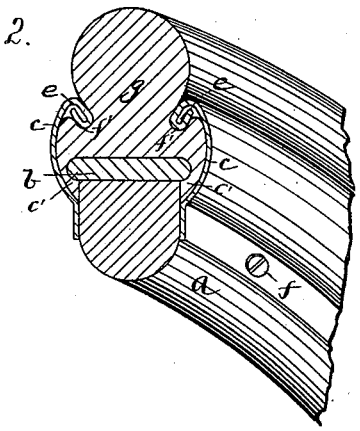
Figure 3:
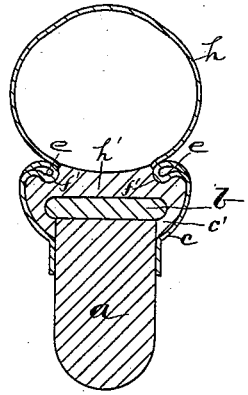

Figure 1 is an elevation of a wheel having my improved tire thereon. Fig. 2 is a cross-section showing my improvements used in connection with a tire constructed of solid rubber. Fig. 3 is a cross-sectional view showing my improvements used in connection with an inflatable tire.

Throughout the different views similar letters of reference indicate corresponding parts.

$a$ designates the usual rim or felly of a wooden wheel.

$b$ is the customary iron tire that is generally used on vehicle-wheels.

The common metallic tire is usually somewhat wider than the rim and projects a slight distance on both sides, as shown in the drawings. These projecting sides of the tire are utilized in the present invention, as will hereinafter appear.

For the purposes of my invention I employ a steel band or clamp $c$, preferably constructed in four parts, as shown in Fig. 1, and secured to both sides of the rim by screws $f$ or otherwise to insure a rigid connection. It is not thought that it would be advantageous to attach these bands in fewer parts than specified. As shown in the sectional views, the said bands curve outwardly and terminate at their outer circumferential edges in enlargements or beads $e$, which are adapted to fit in circumferential channels $f'$, formed in the sides of a solid-rubber tire $g$. This tire $g$ rests against the iron tire $b$ of the wheel, and when the steel bands or clamps $c$ are secured to the sides of the wheel, with the parts $e$ in the channels $f'$, the rubber tire is securely held in position. The extreme lower portions of the rubber tire project over and around the sides of the iron tire $b$, as at $c'$, and the clamping of the bands $c$ against these portions of said rubber tire affords additional means for keeping said rubber tire in position. In order to obtain these downwardly-projecting portions $c'$ of the rubber tire, it is necessary to provide the rubber tire with an inner recess conforming to the cross-sectional shape shown, allowing room for the iron band or tire $b$. The latter forms a shoulder, against which the parts $c'$ are rigidly clamped by the bands $c$. A rubber tire constructed in this manner can be used in connection with any iron tire regardless of the thickness of said tire or the amount of previous wear. In Fig. 3 there is shown similar means for attaching the yielding tire to the wooden rim. The tire $h$, however, in this case is hollow or inflatable and has a solid foundation $h'$, composed of rubber and canvas combined, which is secured to the wooden rim in the manner hereinbefore described—that is, the foundation $h'$ is provided with circumferential channels $f'$, into which the beaded portions of the steel bands $c$ fit, and the parts $c'$, that extend inwardly around the sides of the iron tire $b$, are secured thereagainst by the bands $c$.

It will be observed from the foregoing description that an ordinary vehicle-wheel may thus be fitted with an inflatable tire or other rubber tire without reconstructing the wheel or removing the ordinary iron tire, but, in fact, making the latter serve a new function—to wit, that of assisting in maintaining the rubber tire in position. At each of the abutting ends of the clamping-bands $c$ I use a metal plate $i$, that covers the joint and is secured to the side of the wooden rim by screws or in any suitable manner. These plates serve to keep the edges or ends of the bands $c$ in proper place.

Having fully described my invention, I claim—

In a vehicle-tire, the rim $a$, the metallic tire $b$ secured to the rim, and which tire is wider than the rim so that the edges of the tire project beyond the sides of the rim; and the rubber tire $g$, having projecting portions $c'$ which cover the edges of the metallic tire and extend along the sides of the rim; combined with the sheet-metal clamps which have their inner edges secured to the sides of the rim, and which are curved outwardly and thickened at their outer edges, the said thickened edges catching in recesses formed in opposite sides of the rubber tire, whereby the rubber tire is clamped in position against the metal tire and opposite sides of the rim, substantially as shown and described.

In testimony whereof I affix my signature in presence of two witnesses.

WILLIAM A. SHULER.

Witnesses:
A. J. FIORINI,
R. J. McCARTY.